(12) United States Patent
Welch

(10) Patent No.: US 6,263,996 B1
(45) Date of Patent: *Jul. 24, 2001

(54) WHEEL RETAINER AND LOOSE WHEEL INDICATOR FOR A VEHICLE

(75) Inventor: Donald William Welch, Bowmanville (CA)

(73) Assignee: Pebblestone Multi-Services Inc., Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,143

(22) Filed: Jan. 23, 1998

(30) Foreign Application Priority Data

Jan. 24, 1997 (CA) .................................................. 2195895

(51) Int. Cl.$^7$ .................................................. B60R 21/00
(52) U.S. Cl. .................. 180/271; 280/781; 280/789; 280/762; 280/768; 280/770; 293/126
(58) Field of Search .................... 293/126, 118; 180/271; 280/851, 781, 789, 770, 847, 768, 160, 159, 156, 157, 762

(56) References Cited

U.S. PATENT DOCUMENTS

| | | |
|---|---|---|
| 1,623,849 * | 5/1927 | Orrick .................................. 293/126 |
| 1,988,086 | 1/1935 | Parker . |
| 2,414,676 | 1/1947 | Taurman et al. . |
| 2,647,763 | 8/1953 | Hudson . |
| 2,691,545 | 10/1954 | Lyon . |
| 4,708,400 | 11/1987 | Klomp . |
| 4,993,765 | 2/1991 | Ryan . |
| 5,333,923 | 8/1994 | Whitfield . |
| 5,711,561 * | 1/1998 | Boysen . |
| 5,823,586 * | 10/1998 | Marley ................................ 293/126 |

FOREIGN PATENT DOCUMENTS

| | | | |
|---|---|---|---|
| 2147026 | 5/1997 | (CA) ............................ B60R/19/00 |
| 2157940 | 1/1998 | (CA) . |
| 2194607 | 7/1998 | (CA) ............................ B60R/19/00 |
| 522231 * | 7/1921 | (FR) ................................ 280/851 |
| 661252 * | 1/1928 | (FR) ................................ 280/157 |

* cited by examiner

Primary Examiner—Eric Culbreth
(74) Attorney, Agent, or Firm—Burr & Brown

(57) ABSTRACT

A wheel retainer for the safety of all motor vehicles, and more particularly for trucks of all types, to prevent wheels or wheel assemblies from flying off moving vehicles in the event of axle breakage or other mechanical failure which would cause a wheel or wheel assembly to fly off. The wheel retainer includes brackets for attachment to a truck frame and a retaining bar which is removably attached to the brackets, the bar and brackets being positioned to prevent the wheel or wheel assembly from flying off of the vehicle. In a further modification of the wheel retainer, a loose wheel indicator is provided. The loose wheel indicator is mounted to a turnable or steerable wheel or wheel assembly such as a front wheel of a vehicle. The loose wheel indicator causes an audible noise, audible to the vehicle driver, by contact created between the indicator assembly and the rim of a tire when the wheel or wheel assembly comes loose thereby warning the driver of the loose wheel hazard.

17 Claims, 12 Drawing Sheets

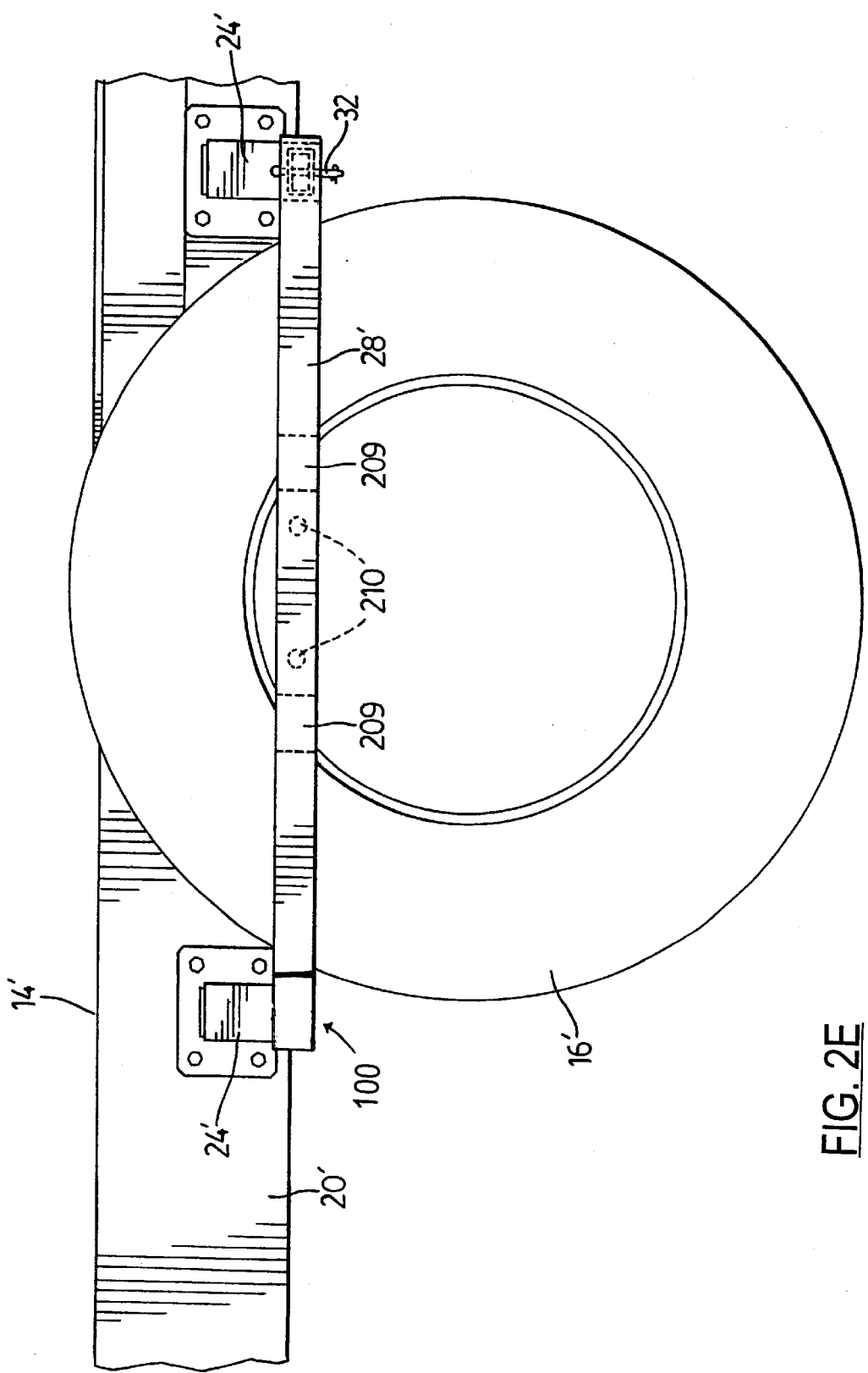

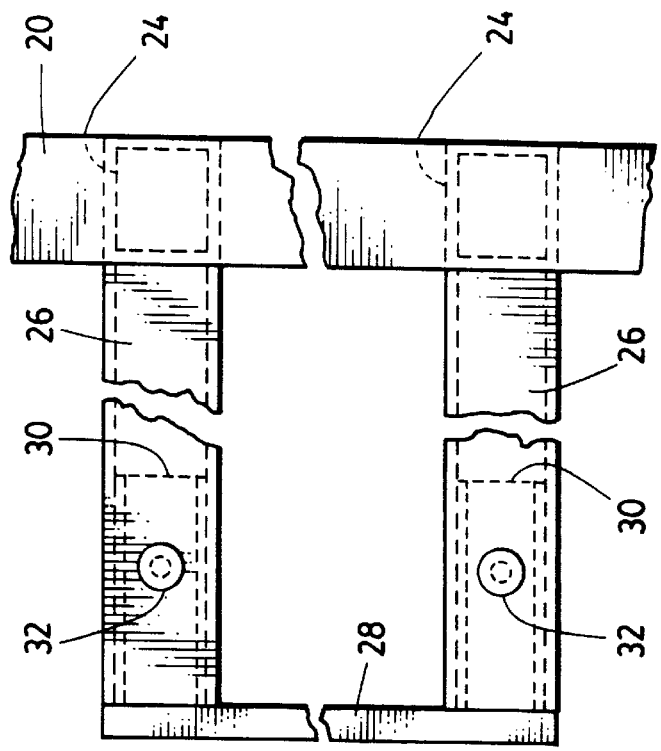
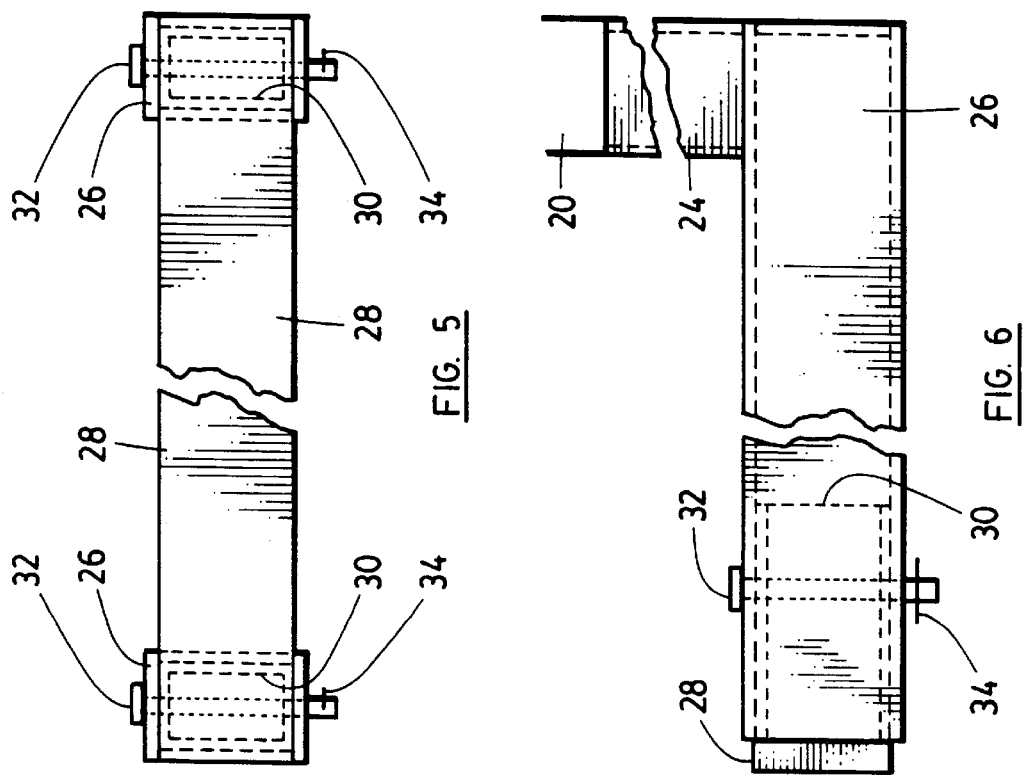

WHEEL RETAINER AND LOOSE WHEEL INDICATOR FOR A VEHICLE

FIELD OF THE INVENTION

The present invention relates to a wheel retainer for the safety of all motor vehicles, and more particularly to a wheel retainer for use on trucks of all types, to prevent wheels or wheel assemblies from flying off a moving vehicle in the event of axle breakage or other mechanical failure which would cause a wheel or wheel assembly to fly off of the vehicle.

The present invention further relates to a loose wheel indicator system for use on vehicles, particularly trucks, to indicate when the wheel or wheel assembly has come loose and is danger of flying off of the vehicle.

BACKGROUND OF THE INVENTION

Of great concern to motor vehicle safety on highways is the loss of wheels and wheel assemblies from all types of trucks, tractors, trailers and even cars, since these wheels and wheel assemblies can cause serious injury to property and personal injury and death. Despite efforts to address this problem by increased maintenance and enforcement of safety regulations, the problem still exists. There is a need for a device which would prevent wheels and wheel assemblies from flying off vehicles even in the event of axle breakage or other mechanical failure which would otherwise cause a wheel or wheel assembly to fly off of the vehicle.

A device for preventing wheels or wheel assemblies from accidentally flying off of moving vehicles is needed to remedy this serious problem. Prior art patents have addressed the prevention of theft of wheels (U.S. Pat. No. 2,647,763 issued Aug. 4, 1953) and the prevention of damage to cars in parking lots due to opening doors of adjacent cars (U.S. Pat. No. 5,333,923, issued Aug. 2, 1994; U.S. Pat. No. 4,993,765, issued Feb. 19, 1991). However, these patents do not disclose a device for preventing wheels or wheel assemblies from flying off of moving vehicles in the event of mechanical failure.

The present invention provides a wheel retainer device which may be used for any type of vehicle and in particular any type of truck to prevent wheels or wheel assemblies from flying off of moving vehicles in the event of axle breakage or other failure which causes wheels or wheel assemblies to fly off of the axle. The wheel retainer of the present invention is adaptable for most types of vehicles and in the preferred embodiments a movable or removable retaining bar allows easy access to wheels or wheel assemblies when wheel maintenance, removal and/or installation is desired.

The wheel retainer of the present invention has been further adapted for the front wheels of a vehicle, particularly the tractor of a tractor-trailer unit, to act as an indicator device which warns the driver of the vehicle that the wheel or wheel assembly is loose and at risk of falling or flying off of the vehicle.

SUMMARY OF THE INVENTION

According to one aspect of the present invention a wheel retainer is provided for preventing wheel or wheel assemblies on vehicles from flying off moving vehicles. According to another aspect of the present invention the wheel retainer of the present invention can be modified or adapted to act as a loose wheel indicator device rather than an actual wheel retainer.

According to another aspect of the present invention, a loose wheel indicator is provided for at least one turnable (i.e. steerable) wheel or wheel assembly of a vehicle, typically a front wheel or wheel assembly.

In accordance with another aspect of the present invention, the loose wheel indicator device of the present invention comprises in one embodiment a substantially J-shaped bracket having a long transverse portion (extending transversely to the axle of the wheel or wheel assembly) extending along the inside of the wheel assembly and a short transverse portion (extending transversely to the axle of the wheel or wheel assembly) extending on the outside of the wheel assembly substantially parallel to the long portion, the long portion adapted for mounting to a brake flange or steering knuckle of a front wheel of a vehicle at a first end such that the long portion extends transversely to the axis of the wheel or wheel assembly on the inside of the wheel or wheel assembly and the short transverse portion extends transversely to the axis of the wheel or wheel assembly on the outside of the wheel or wheel assembly. The short portion has a free distal end having an inner surface facing towards the rim of a tire on the wheel or wheel assembly, the inner face comprising a metal portion (or other suitable material) wherein the metal portion is positioned close to the rim of the tire so if the tire, wheel, or wheel assembly comes loose the metal portion on the inner face of the free end of the short arm will come into contact with the tire rim and make a noise which is audible to the driver of the vehicle thereby alerting the driver to the loose wheel hazard.

In another embodiment of the invention the loose wheel indicator is bolted to a brake flange of a wheel assembly. In yet another embodiment, the loose wheel indicator may be either a continuous piece or constructed of several pieces joined together. In yet another embodiment, the loose wheel indicator is mountable either on a steering wheel or a non-steering wheel of the vehicle.

In accordance with another aspect of the present invention there is provided a wheel retainer which, in one embodiment, comprises:

a pair of mounting brackets; and a retaining bar;

wherein the mounting brackets have a first portion with a first end and a second portion with a second end, the mounting brackets are mounted on an underframe of a vehicle on either side of an axle holding one or more wheels, such that the first end of the first portion of the mounting bracket attaches to the underframe and extends below the underframe to the second portion, the second portion of the mounting bracket extending outwardly parallel to and at a height above the axle, to the second end in front of the outermost of the one or more wheels, the retaining bar running substantially perpendicular to the axle from the second end of one mounting bracket to the second end of the other mounting bracket.

The mounting brackets may, in an alternate embodiment, be mounted on the suspension assembly of a vehicle. In theory the wheel retainer could be mounted directly on the wheel assembly if the wheel assembly were strong enough to hold it in place in the event that the wheel or wheel assembly flies off of the vehicle. This latter embodiment would be applicable to steerable front wheel assemblies for which it is not possible to mount the retainer on the vehicle underframe or suspension assembly.

In accordance with another aspect of the invention, there is provided a wheel retainer for retaining a wheel assembly on a vehicle, the wheel retainer comprising:

a pair of mounting brackets, said mounting brackets having a first portion with a first end and a second portion with a second end, the mounting brackets adapted to be mountable on an underframe of a vehicle, a suspension assembly of a vehicle or directly on the wheel assembly of a vehicle, to bracket an axle of the vehicle on which at least one wheel is held, such that the first end of the first portion of the mounting bracket attaches to the underframe, suspension or assembly and extends below the underframe to the second portion, the second portion of the mounting bracket extending outwardly parallel to the axle, to the second end in front of the outermost of the one or more wheels; and at least one retaining bar, said at least one retaining bar extending perpendicular to said axle from the second end of one mounting bracket to the second end of the other mounting bracket.

In accordance with a preferred embodiment of the invention, the wheel retainer is mounted to the underframe or suspension of a vehicle.

In accordance with a further aspect of the present invention there is provided a wheel retainer wherein the second portion of the mounting bracket is a hollow tube and the second end is open, and the retaining bar additionally comprises substantially perpendicular tube portions at its ends, which perpendicular tube portions slide into the second ends of the mounting brackets and there is further provided a fastening means for removably fastening the retaining bar to the mounting brackets by a removable retaining bolt running substantially perpendicularly through the hollow tube of the mounting bracket and the perpendicular tube portion of the retaining bar and secured with a retaining clip.

In accordance with another aspect of the present invention, the retaining bar is movably or removably joined to the mounting bracket by a hinge swinging outwards or upwards to allow a wheel or wheels to be accessed.

In accordance with another aspect of the invention, the wheel retainer of the present invention may be adapted to span a plurality of wheel assemblies.

In accordance with another aspect of the present invention, for attachment to a turning front wheel or wheel assembly, the first end of the first portion of the mounting bracket is adapted for mounting on the front wheel or front wheel assembly of a vehicle.

In accordance with another aspect of the present invention, the components of the wheel retainer are made of cold rolled steel, stainless steel or aluminum.

BRIEF DESCRIPTION OF THE DRAWINGS

The fixture assembly of the present invention will be described in greater detail with reference to the accompanying drawings, in which like numerals refer to like parts and in which different embodiments of the same parts are indicated by the same reference numeral with a prime:

FIG. 2E is a side view of another embodiment of the wheel retainer shown in FIG. 2B;

FIG. 5 is a detailed view of the retaining bar of the wheel retainer illustrated in FIG. 2A;

FIG. 6 is a detailed view of the mounting bracket of the wheel retainer illustrated in FIG. 3;

FIG. 7 is a detailed view of the wheel retainer illustrated in FIG. 4;

Figure 1A:
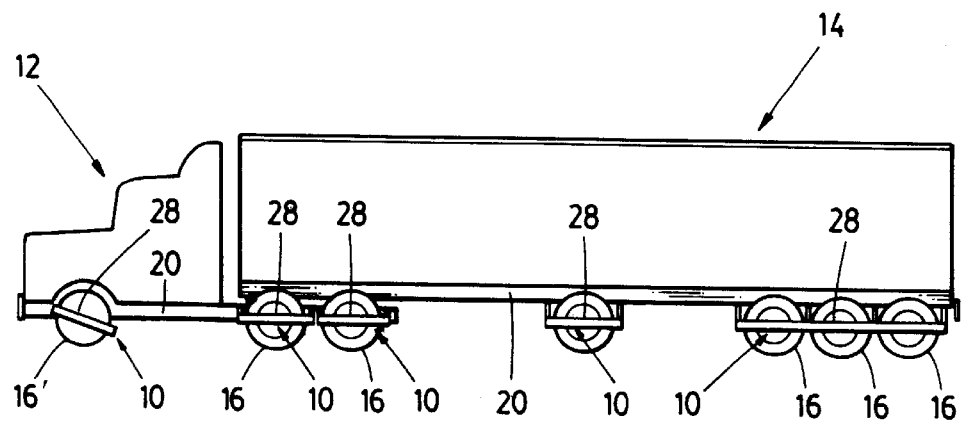
FIG. 1A is a side view of a tractor trailer illustrating one embodiment of the wheel retainer of the present invention in which the wheel retainer is positioned at the mid-point of the wheel.

In the drawings, preferred embodiments of the invention are illustrated by way of example. Other and further advantages and features of the invention will be apparent to those skilled in the art from the following detailed description thereof and the accompanying drawings.

It is to be expressly understood that the description and drawings are illustrative of certain embodiments of the invention which are defined by the accompanying claims.

DETAILED DESCRIPTION OF THE INVENTION

Figure 8:
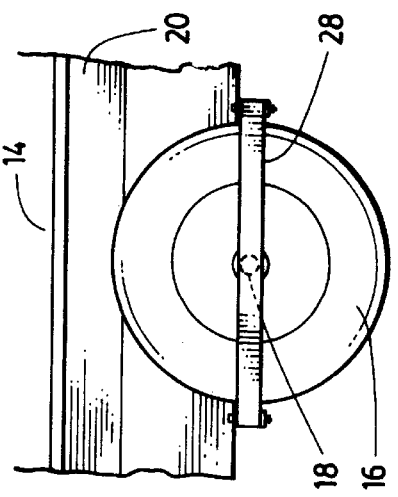
FIG. 8 is a side view of the wheel retainer of a second embodiment of the present invention.
Figure 9:
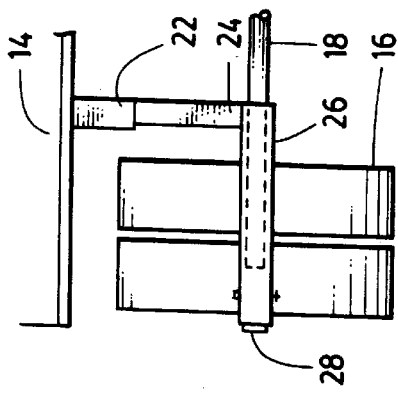
FIG. 9 is a rear view of the wheel retainer illustrated in FIG. 8.
Figure 10:
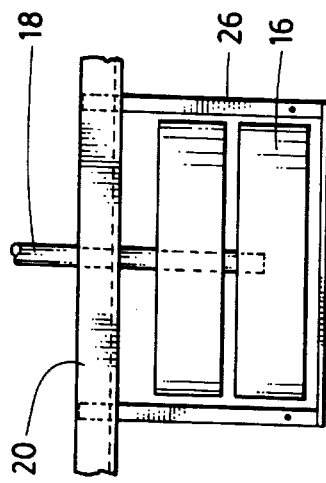
FIG. 10 is a top view of the wheel retainer illustrated in FIG. 8.
Figure 11:
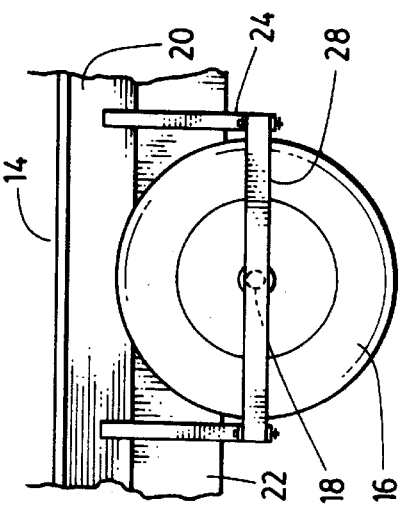
FIG. 11 is a side view of the wheel retainer of a third embodiment of the present invention.
Figure 12:
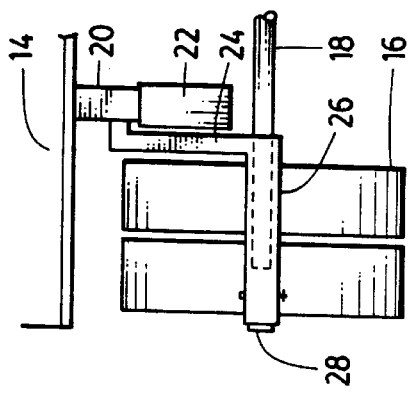
FIG. 12 is a rear view of the wheel retainer illustrated in FIG. 11.
Figure 13:
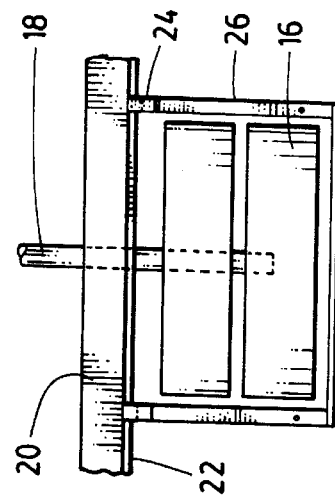
FIG. 13 is a top view of the wheel retainer illustrated in FIG. 12.

FIG. 1A illustrates the wheel retainer installed on the rear wheels of a tractor and on the wheels of a trailer attached to the tractor. FIGS. 2A, and 3 to 7 illustrate the wheel retainer of a first embodiment of the present invention. FIGS. 8 to 10 illustrate the wheel retainer of a second embodiment of the present invention. FIGS. 11 to 13 illustrate the wheel retainer of a third embodiment of the present invention. In the present detailed description the terms wheel and wheel assembly are used interchangeably for the most part.

FIG. 1A illustrates the wheel retainer 10 of the present invention on a tractor 12 and trailer 14, in which seven of the wheel assemblies 16 are shown. In the depicted embodiment, the tractor 12 has three axles 18 (not shown) and the trailer has four axles 18 (not shown), each axle 18 having at least two wheel assemblies mounted thereon. One wheel assembly usually comprises two wheels; however, some wheel assemblies comprise only one wheel, such as the front wheel assembly of a tractor 12 or a rear wheel assembly of a trailer 14 having an enlarged wheel.

FIG. 1A illustrates three possible modifications of the wheel retainer 10: I) for wheel assemblies which turn, as shown for the first wheel assembly on the tractor; II) for non-turning wheel assemblies spaced apart, as shown for the second and third wheel assemblies on the tractor and the first wheel assembly on the trailer; and III) for non-turning wheel assemblies spaced close together, as shown for the second, third and fourth wheel assemblies on the trailer.

Turning in this description refers to the fact that the wheel or wheel assembly is turnable. In other words it is a wheel or wheel assembly which steers the vehicle. Typically it is the front wheels of a vehicle which are steerable (type I modification). The rear wheels or wheel assemblies are typically not steerable (modification types II and III).

One skilled in the art would know that the wheel retainer of the present invention may be mounted differently depending on whether it is mounted on the front wheel assembly (modification type I) or the rear wheel assemblies (modification type II) of a tractor. Similarly on the trailer, one skilled in the art would appreciate that the wheel retainer is mounted differently depending on whether the wheel assemblies are spaced substantially apart (modification type II) or close together (modification type III).

Figure 1B:
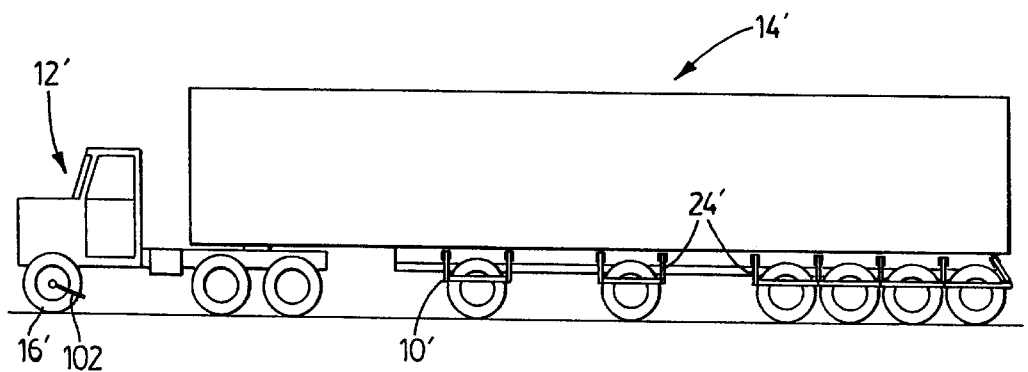
FIG. 1B is another side view of a tractor trailer illustrating another embodiment of the wheel retainer of the present invention in which the wheel retainer is positioned in the upper half of the wheel or wheel assembly.
Figure 1C:
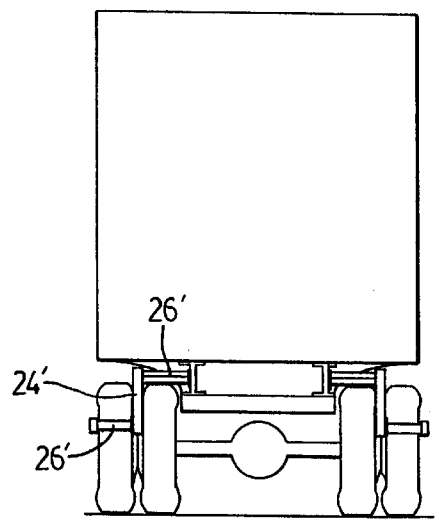
FIG. 1C is a rear view of a tractor trailer of FIG. 1B illustrating another embodiment of the wheel retainer as positioned on the rearmost wheel assemblies of a vehicle having paired wheel assemblies.

FIG. 1B is an overview of a tractor trailer such as found in FIG. 1A but it illustrates different embodiments and modifications of the wheel retainer of the present invention on the rear wheel assemblies and the loose wheel indicator is depicted on the front wheel assembly. FIG. 1B illustrates a tractor 12' and trailer 14' having a further modified version of the wheel retainer on the front wheel assembly 16' of the tractor 12'. In this modification the retainer has been further modified to act as a loose wheel indicator device 102 rather than retaining the wheel per se. On many vehicles the wheel retainer of the present invention is not mountable on front wheel assemblies which turn (modification type I as illustrated in FIG. 1A). As described in further detail below, the wheel retainer of the present invention has been modified from a design to contain the wheel if it flies off the vehicle to a device which creates a distinct sound or noise in the event that the wheel or wheel assembly becomes loose. In the present application this latter version is referred to as a loose wheel indicator as it functions differently from the wheel retainer.

The wheel retainer 10 in FIG. 1A and 10' in FIG. 1B is typically mounted directly to the underframe 20 of the vehicle or the suspension assembly 22 of the vehicle whereas the loose wheel indicator 102 is mounted directly onto the turnable wheel assembly 16', as described in greater detail below. The difficulty with mounting the wheel retainer directly onto the wheel assembly (as would be necessary for steerable wheel assemblies) is that current vehicle designs and wheel assembly designs do not permit a strong enough point of attachment which will withstand the forces if the wheel or wheel assembly flies of the vehicle when in motion. The loose wheel indicator is an alternative design for steerable wheels or wheel assemblies as it can be securely mounted on the brake flange of the wheel or wheel assembly. Although the steering knuckle is another possible attachment point for the loose wheel indicator device of the present invention, current designs are not considered strong enough for safe securement of the device. While some modifications to the steering knuckle could well make this more possible such modifications are not consistent with current vehicle designs.

FIGS. 2A and 3 through 13 describe the wheel retainer of modification type II.

Figure 2A:
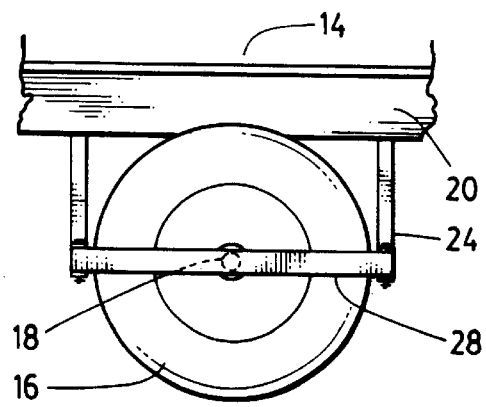
FIG. 2A is a side view of the wheel retainer of a first embodiment of the present invention.
Figure 3:
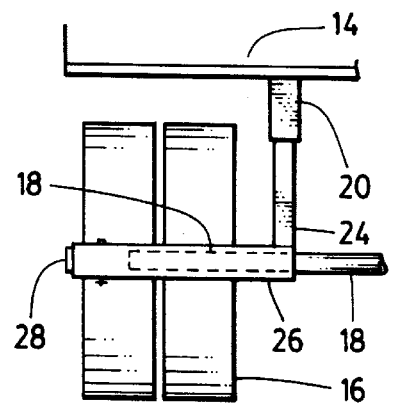
FIG. 3 is a rear view of the wheel retainer illustrated in FIG. 2A.
Figure 4:
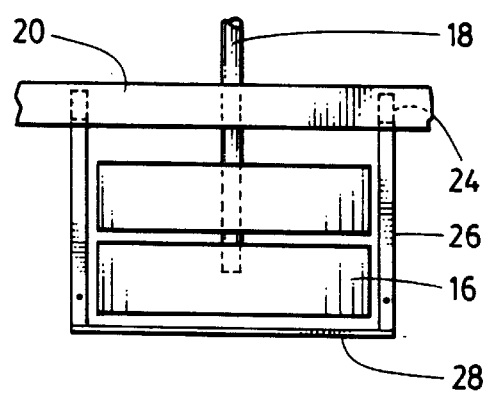
FIG. 4 is a top view of the wheel retainer illustrated in FIG. 2A.

FIGS. 2A, 3, 4, 5, 6 and 7 illustrate the wheel retainer 10 of a first embodiment of the present invention and FIGS. 2A, 3 and 4 illustrate the wheel retainer 10 in relation to the wheel assembly 16, axle 18, and underframe 20 of the trailer 14. The first portion of each mounting bracket 24 is mounted on either side of the axle to the underframe 20 by welding or bolting (not shown) and each first portion of mounting bracket 24 extends downwardly to a second portion of the mounting bracket 26 which extends substantially perpendicularly to the first portion of the mounting bracket 24 and outwardly parallel to the axle 18. In one embodiment, the retaining bar 28 has perpendicular tube portions 30 which slide into the hollow second portion of the mounting bracket 26 and are secured by a retaining bolt 32 and retaining clip 34, which bolt runs through the second portion of the mounting bracket 26 and the perpendicular tube portion 30 of the retaining bar 28.

FIGS. 8, 9 and 10 illustrate the wheel retainer 10 of a second embodiment of the wheel retainer of the present invention in relation to the wheel assembly 16, axle 18, underframe 20 and underframe 22 of the trailer 14. A first portion of the mounting bracket 26 is attached by welding or bolting (not shown) to the underframe 22 and the first portion of the mounting bracket 26 is contiguous with a second portion of the mounting bracket, and the mounting bracket 26 extends perpendicularly to the suspension assembly 22 and outwardly parallel to the axle. The retaining bar 28 has perpendicular tube portions 30 which slide into the hollow second portion of the mounting bracket 26 and are secured by a retaining bolt 32 and retaining clip 34, which bolt runs through the second portion of the mounting bracket 26 and the perpendicular tube portions 30 of the retaining bar 28.

FIGS. 11, 12 and 13 illustrate the wheel retainer 10 of a third embodiment of the present invention in relation to the wheel assembly 16, axle 18, underframe 20 and suspension assembly 22 of the trailer 14. The first portion of the mounting bracket 24 is attached by welding or bolting (not shown) to the underframe 20 and extends outwardly before extending downwardly to the second portion of the mounting bracket 26, in order to avoid the suspension assembly 22. The second portion of the mounting bracket 26 extends outwardly parallel to the axle. The retaining bar 28 has perpendicular tube portions 30 which slide into the hollow second portion of the mounting bracket 26 and are secured by a retaining bolt 32 and retaining clip 34, which bolt runs through the second portion of the mounting bracket 26 and the perpendicular tube portions 30 of the retaining bar 28.

It is preferred that the retaining bar 28 be either movable or removable. A movable or removable retaining bar 28 is advantageous since it allows ease of access to the wheel assembly. Other methods may also be used to allow this access and include a hinge mechanism 100 (FIG. 2E) or a biasing means, such as a spring mechanism schematically shown at, to allow the retaining bar to swing outwardly, upwardly or downwardly away from the wheel assembly to permit access to the wheel assembly. For example, this would be advantageous when the wheel or wheel assembly must be repaired or replaced.

The first wheel assemblies 16' of the tractor 12 or 12' respectively are turnable (i.e. steerable) unlike the rear wheel assemblies 16 of the tractor 12 or 12' and the wheel assemblies of the trailer 14 and 14'. The turnable wheel assemblies require a variation in how the wheel retainer or loose wheel indicator are mounted. In the case of the wheel retainer 10 it is installed by mounting the first portion of the mounting bracket 24 to either the brake flange or the steering knuckle (not shown). However, current vehicle designs do not permit the secure attachment of the wheel retainer of the present invention directly on turnable wheel assemblies. The wheel retainer of the present invention is therefore best secured on the vehicle body such as on the underframe or the suspension assembly; however, that is not practical for front wheels.

It is therefore provided that the loose wheel indicator 102 be mounted on the turnable wheel assemblies rather than the wheel retainer 10. In a preferred embodiment that the loose wheel indicator be installed by bolting to the brake flange (see FIG. 17) as further described below. One skilled in the art would appreciate that in some instances it may be possible to attach the loose wheel indicator to the steering knuckle but generally this does not work as well as the mounting on the brake flange.

FIG. 1A broadly illustrates the positioning of wheel retainer 10 to the first wheel assembly 16' of the tractor 12. The mounting brackets are mounted to the steering knuckle (not shown) in such a way such that the retaining bar 28 is on a diagonal to allow the wheel assembly 16 to turn and not hit the retaining bar 28. In addition, the components of the wheel retainer 10 should be substantially flat, apart from the second portion of the mounting bracket 26.

FIG. 1B broadly illustrates the position of the loose wheel indicator 102 of the present invention on the first wheel assembly 16' of the tractor 12'. It is preferably mounted on a diagonal to allow the wheel assembly 16' to turn without hitting the loose wheel indicator 102 attached thereto. In a preferred embodiment the components of the loose wheel indicator 102 should be substantially flat apart from cross portion 104.

Either the wheel retainer 10, or the loose wheel indicator 102, is installed to allow wheel rotation on the wheel assembly. In the case of the wheel retainer, the retaining bar 28 and second portion of the mounting bracket 26 are positioned to be close to the wheel assembly 16, to ensure retention of the wheel or wheel assembly in the event it flies off, yet still allow free rotation of the wheels. It is preferred that the retaining bar 28 and second portion of the mounting bracket 26 are positioned to be as close to the wheel assembly 16 as will allow free rotation of the wheels. In one embodiment of the present invention, the retaining bar 28 is positioned approximately one-half inch from the wheel assembly 16 and the second portion of the mounting bracket 26 is positioned approximately 1 to 2 inches from the wheel assembly 16. This minimizes the movement of the wheel assembly 16 in the event of failure of the axle or other part which causes the wheel assembly 16 to become detached and fly off of a moving vehicle yet still permits the wheel to move freely when the vehicle is in use.

The wheel retainer 10 or 10' may be varied to serve groups of wheel assemblies. In one variation, a single retaining bar 28 is used to span the group of wheel assemblies and this retaining bar may be attached to a plurality of mounting brackets 26 by a plurality of perpendicular tube portions 30 of the retaining bar and a plurality of retaining bolts 32 and clips 34. FIGS. 1A illustrates this modification for the second, third and fourth wheel assemblies 16 of the trailer 14.

The wheel retainer 10 or 10' of the present invention is adaptable for the type of vehicle and the weight of wheels or wheel assemblies 16 and 16' which it will retain in the event of axle breakage or other event which normally would cause the wheels or wheel assemblies to fly off. The components of the wheel retainer may be made of steel, stainless steel, or aluminum. It will be recognized that the wheel retainer 10 of the present invention can also be made from alternate materials and still perform the same end function as described herein. In one embodiment of the present invention the retaining bar 28 is made of steel and is 3 inches wide and ½ to ¾ inches thick; the perpendicular tube portions 30 are welded onto the retaining bar 28 and are 3 inches by 2 inches with ¼ inch wall thickness; the retaining bolt 32 is ⅝ inch diameter by 4 and ½ inches long with a ⅛ inch diameter by 2 inch long retaining clip 34; the second portions of the mounting brackets 26 are 3 and ½ inches by 2 and ½ inches with ¼ inch wall thickness; and the second portions of the mounting brackets 26 are welded to the first portions of the mounting brackets 24 which in turn are welded or bolted onto the underframe 20.

The size of the components of the wheel retainer 10 depend on the vehicle and the weight of the wheel or wheel assembly which is to be retained.

Figure 2B:
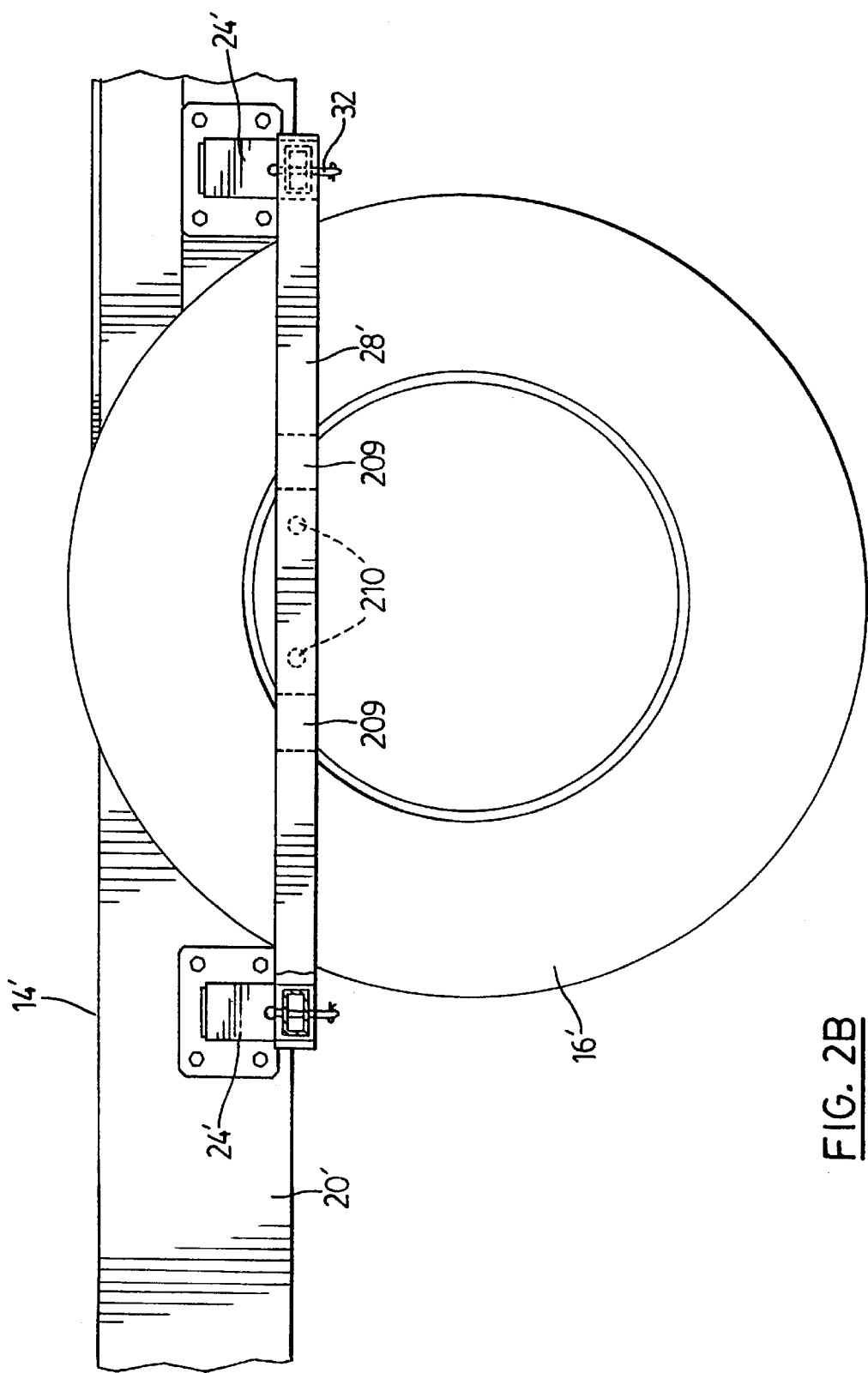
FIG. 2B is a side view of an alternate embodiment of the wheel retainer of the present invention illustrating the position of the retaining bar with respect to the wheel such that the retaining bar is positioned in the upper portion of the wheel.
Figure 2C:
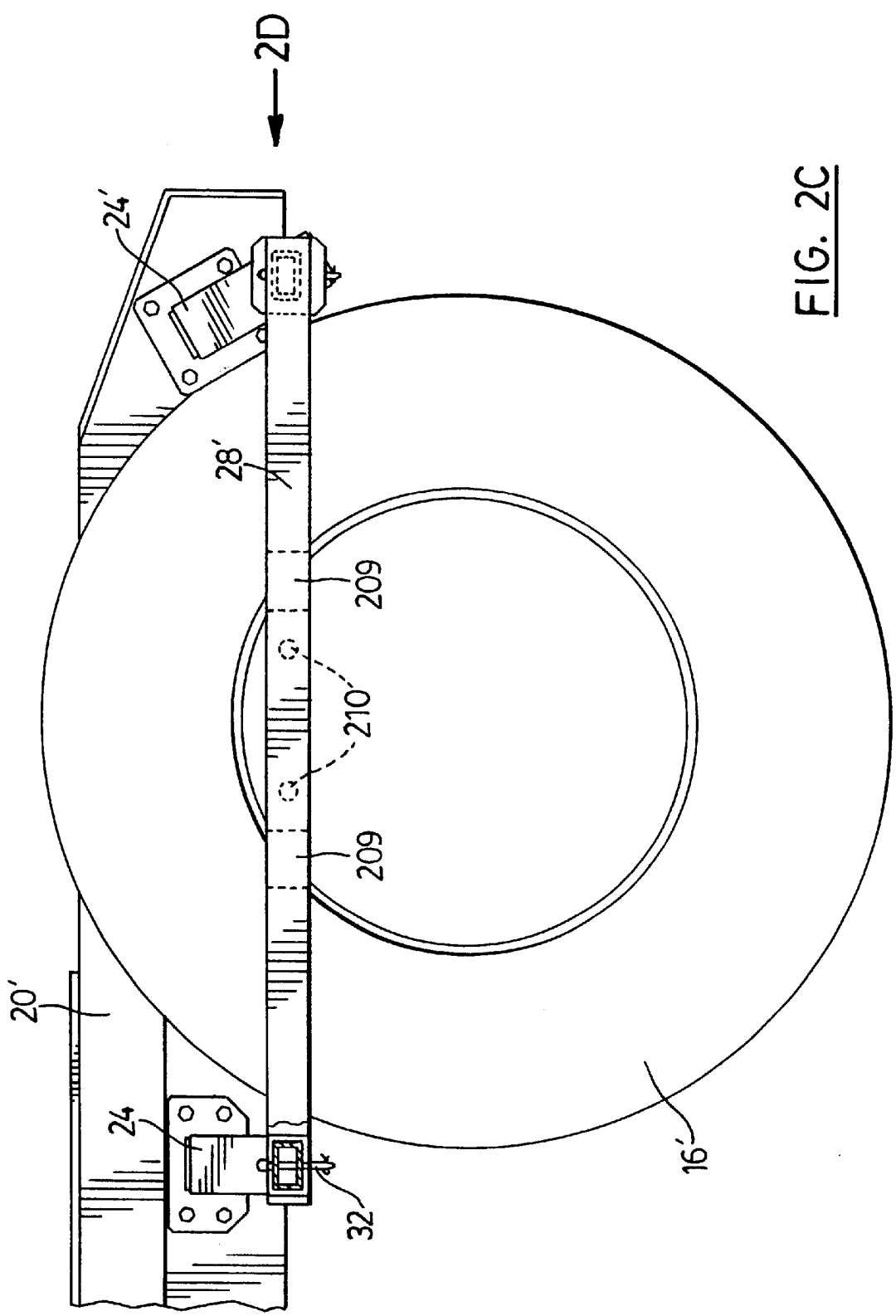
FIG. 2C is a side view of another embodiment of the wheel retainer as positioned on the rearmost wheel assembly of the vehicle illustrated in FIG. 1B.
Figure 2D:
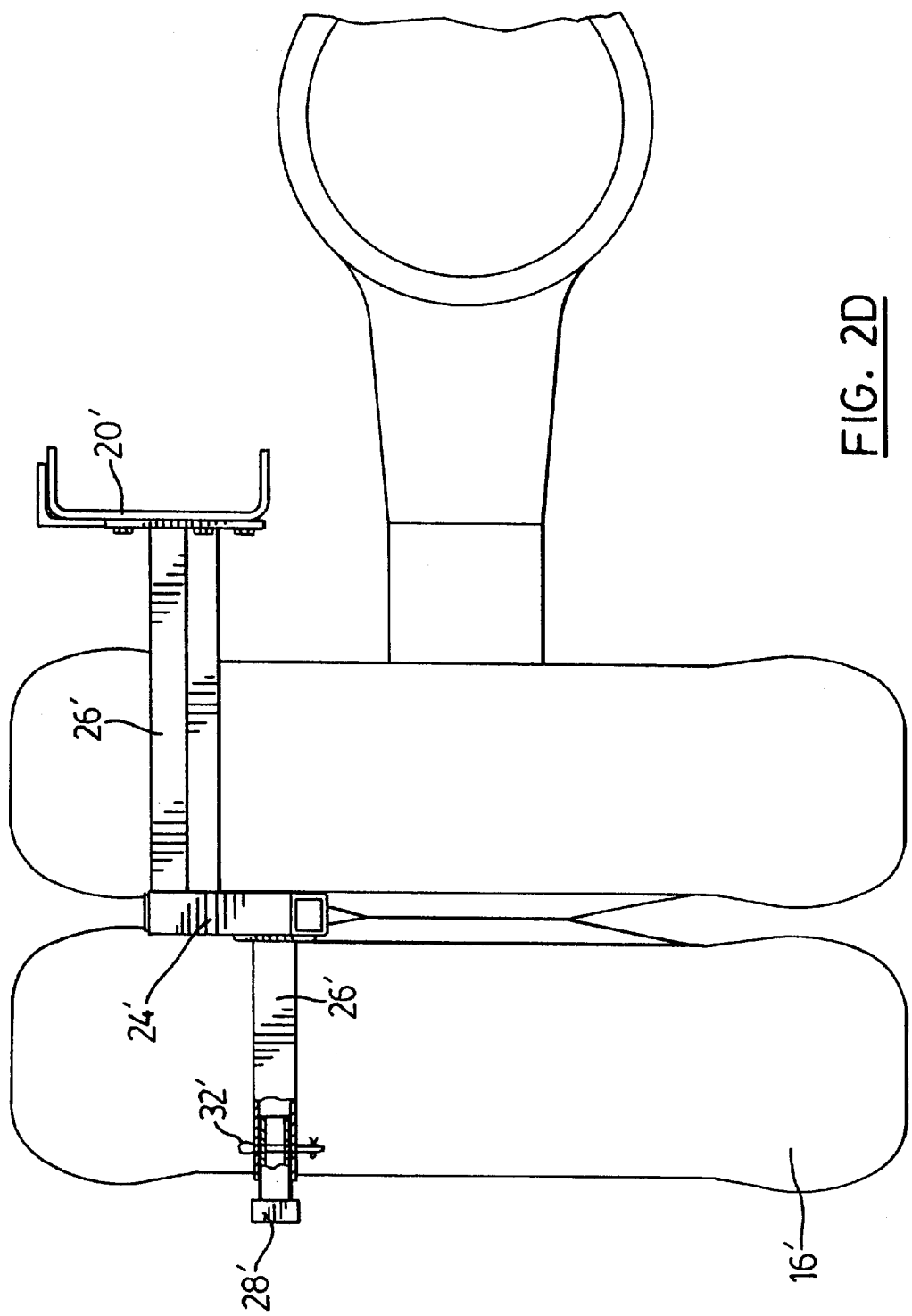
FIG. 2D is an end elevational view of the wheel retainer as mounted on the last wheel assembly of a trailer.

FIGS. 1B, 2B, 2C and 2D illustrate another embodiment of the wheel retainer of the present invention in which the retaining bar 28' in the upper half of the wheel or wheel assembly 16'. In the illustrated embodiment, the retaining bar 28' is mounted on the underframe 20' of the vehicle 14'. FIGS. 2C and 2D further illustrate how one bracket of the wheel retainer can be angled or dog-legged to attach to the rear of the vehicle between multiple wheel assemblies.

Figure 14:
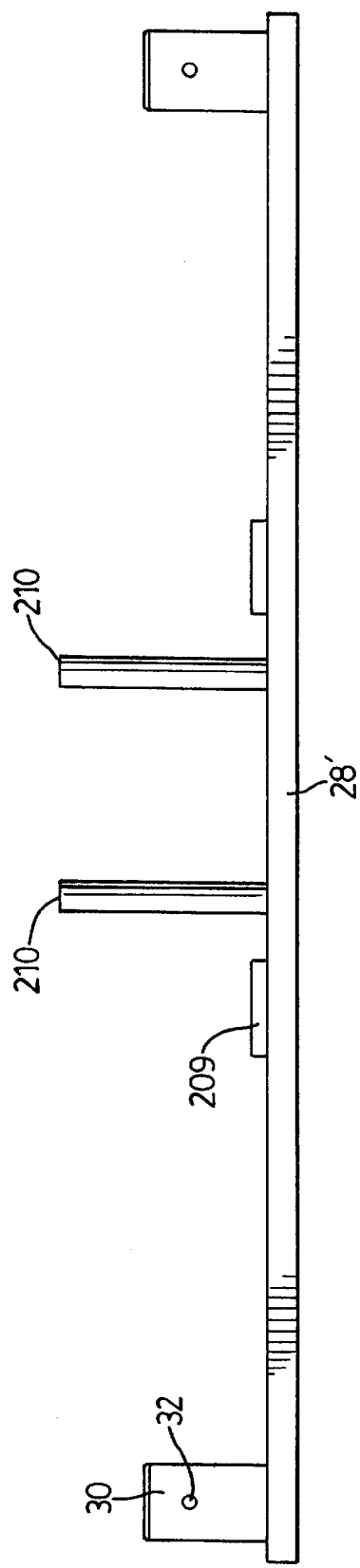
FIG. 14 is a top view of the retaining bar of the wheel retainer illustrating an embodiment having an additional feature of rods or prongs to catch the rim of the tire and wear pads for the rim to rub against.

FIG. 14 is a top view of a modification of the retaining bar 28 or 28' of the wheel retainer 10 or 10'. In this modification there are two additional features illustrated on the retaining bar 28 or 28'. One additional feature is the addition of rods, or prongs, 210 adapted to catch the rim of the tire in the event that the wheel or wheel assembly flies off of the vehicle. The rods/prongs 210 are intended to constrain the tire within the wheel retainer by catching the inside part of the rim thereby preventing the wheel from dropping down or jumping up and out of the contained area. The second additional feature is wear pads 209 adapted and positioned such that the rim of the tire will rub against the wear pads to reduce deterioration of the tire if the wheel or wheel assembly flies off the vehicle. The wear pads are provided for the rim of the wheel to rub against providing extra wearing surface.

Figure 15:
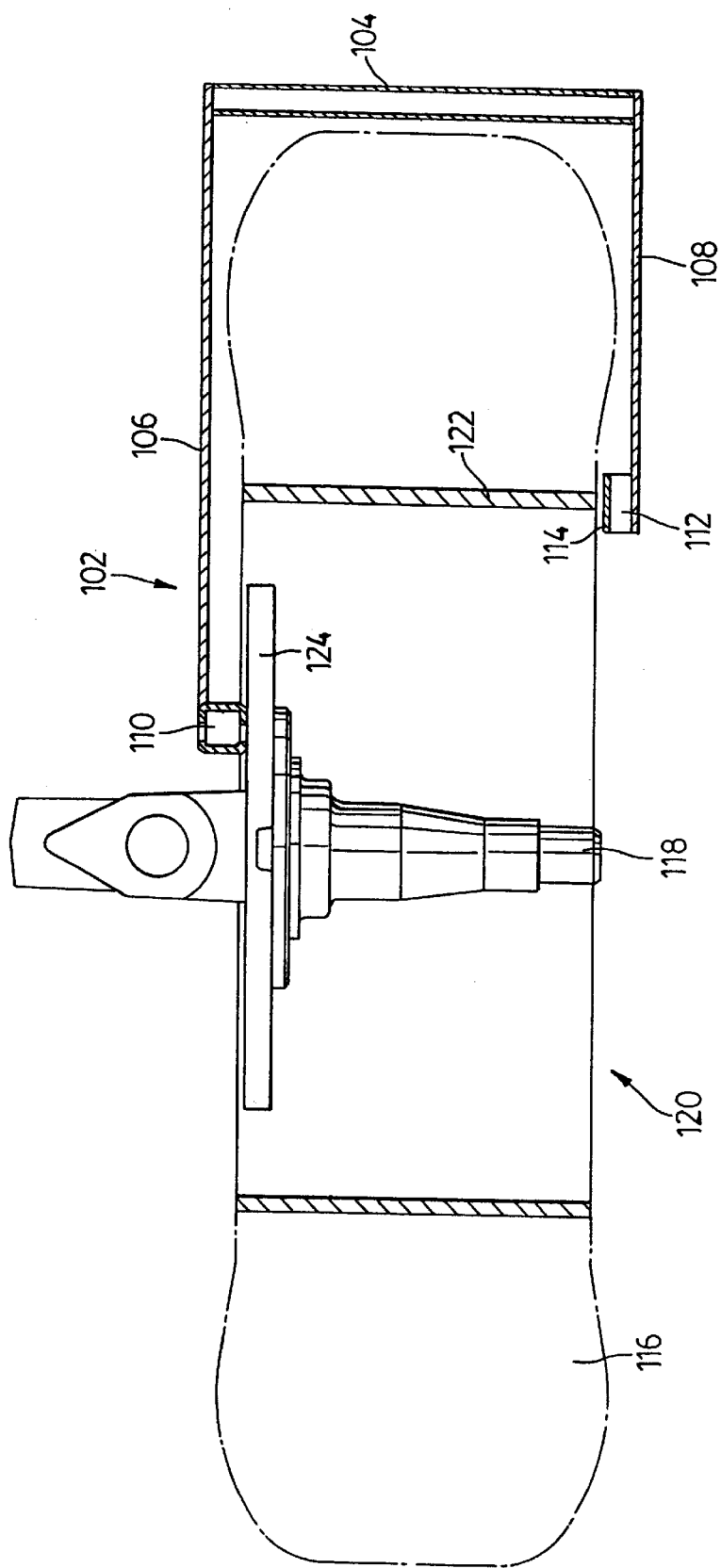
FIG. 15 is a schematic top view of the loose wheel indicator of the present invention.
Figure 16:
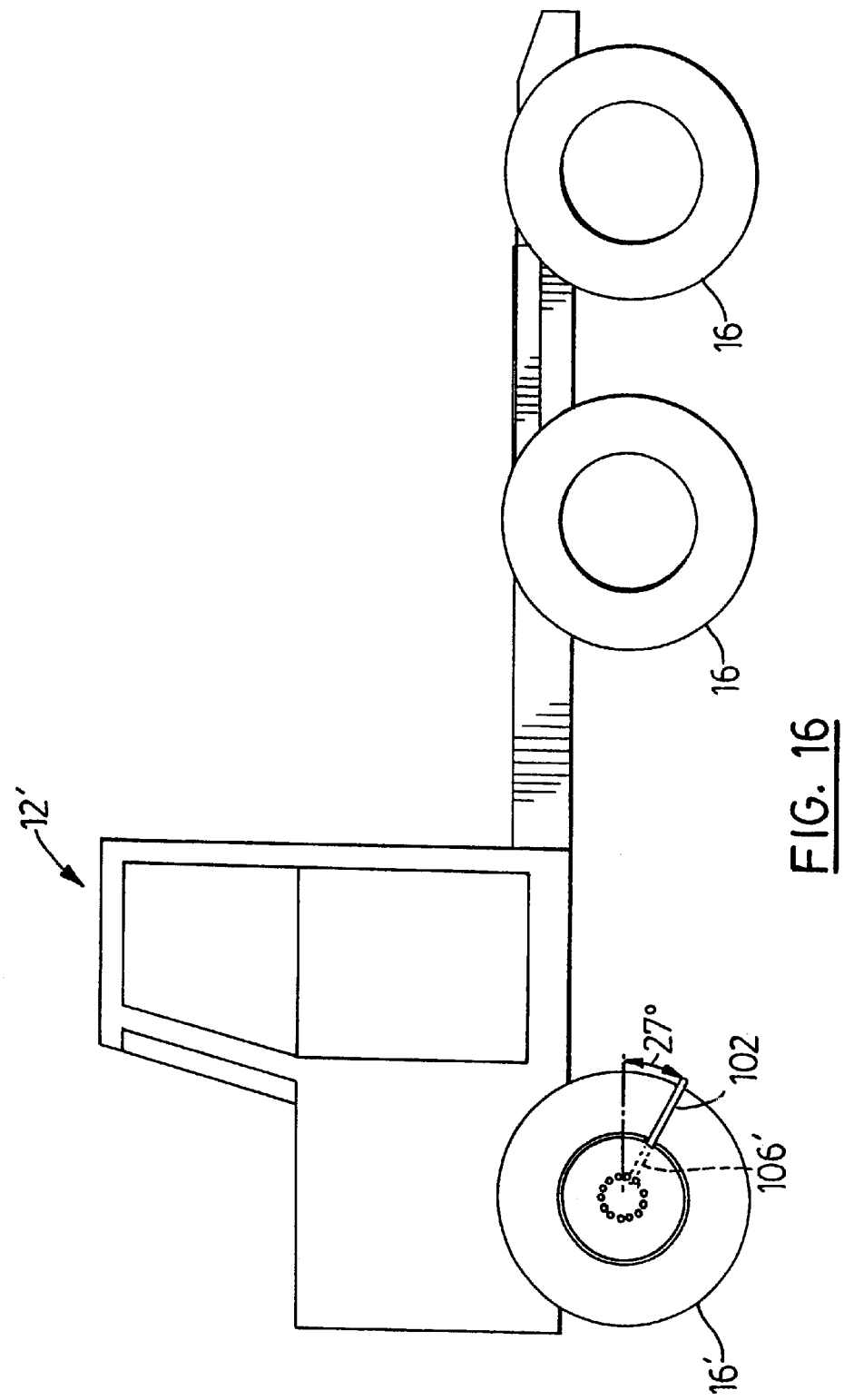
FIG. 16 is a side view of a tractor illustrating the loose wheel indicator of the present invention as positioned on the front wheel of the vehicle.
Figure 17:
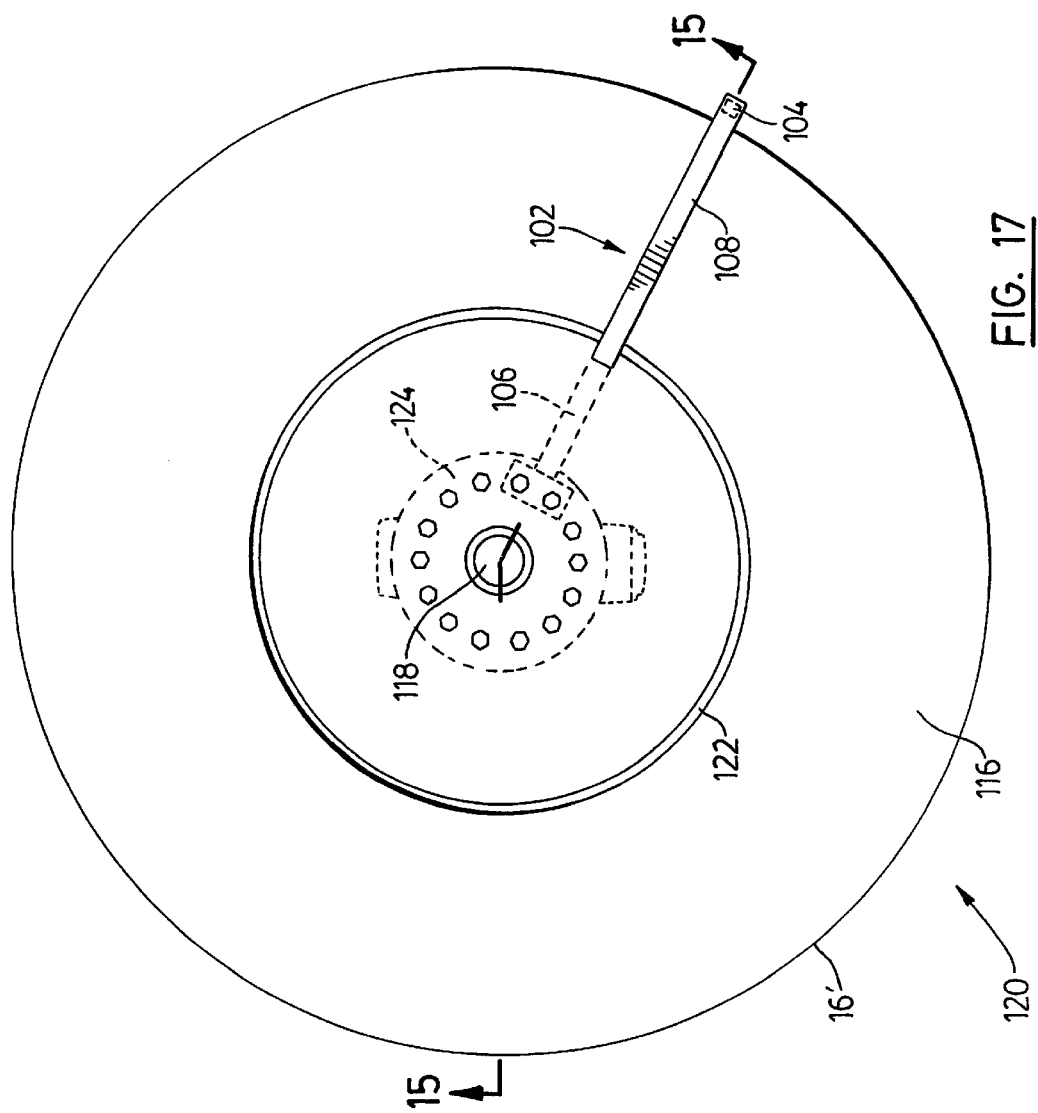
FIG. 17 is a side view of the loose wheel indicator of the present invention illustrating its attachment to the wheel assembly of the vehicle.

FIG. 15 is a schematic top view of the loose wheel indicator 102 of the present invention. FIG. 16 is a side view of tractor 12' illustrating the loose wheel indicator of the present invention as positioned on the turnable front wheel assembly 16' of the vehicle. FIG. 17 is a side view of the loose wheel indicator 102 of the present invention illustrating in more detail its attachment to the brake flange of the turnable wheel assembly 16' of the vehicle.

In the present invention the loose wheel indicator 102 is preferably bolted to the brake flange of a turnable wheel assembly such as first wheel assembly 16' such that it does not interfere with the free rotation of the tire or wheel of the vehicle when the vehicle is moving and the wheel assemblies are turning. In one embodiment, illustrated in FIG. 16, the indicator 102 is mounted at an angle of about 27 degrees below the horizontal midpoint of the wheel or wheel assembly. The invention is not limited to an angle of 27 degrees and other suitable angles, to allow the wheel assembly to be steered and the tire to freely rotate without contacting the indicator, would be readily recognizable to a person skilled in the art. The indicator is illustrated as being positioned at the back or rear of the first wheel assembly so that it is less likely to break off when in use.

Two first portions 106 and 108 extend on either side of the wheel or wheel assembly perpendicular to the axle 118. A second cross portion 104 extends parallel to the axle, outwardly from the wheel and tire of the wheel assembly. The side portions 106 and 108 are of different lengths and only one attaches to the underframe or suspension assembly of the vehicle. Instead the first side portion 106 of the J-shaped loose wheel indicator 102 attaches directly to the wheel assembly. It is particularly preferred that the first side portion 106 attach to the wheel assembly 120 at the brake flange 124 where it is typically bolted in place through spacer 110 (which is welded to member 106). It is possible that in certain vehicles or wheel assemblies the first side portion 106 may be attached to the steering knuckle of the wheel assembly if the steering knuckle mount is able to withstand the forces placed upon it when in use.

The two side portions 106 and 108 may be separate brackets which are joined to the cross portion 104. Standard joining means as would be known to persons skilled in the art would be appropriate so long as the joining means securely attaches the two side portions of the indicator to the cross portion. In the illustrated embodiment of FIG. 15 the side portions 106, 108 and cross arm portion 104 are welded together.

The cross portion 104 which forms the bottom of what is described generally as a J-shaped bracket extends between the longer side portion 106 and the shorter side portion 108 extending substantially parallel to the axle 118 of the wheel assembly 120.

The longer side portion 106 and the shorter side portion 108 are substantially parallel, one to the other, and in a preferred embodiment these two arms form a substantially 90° angle with the cross-arm portion 104, as illustrated in FIG. 15.

At the distal end (defined as the end furthest away from the cross portion 104) of the shorter side portion 108, there is a member 112 mounted on the inside (facing the rim of the tire). On its face, member 112 has a metal portion 114 positioned between the short arm portion 108 of the loose wheel indicator 102 and the rim 122 of the tire 116.

In operation, if the wheel or wheel assembly begins to loosen it will cause a wobble in the wheel assembly rotation when the vehicle is in motion. This, in turn, will cause the rim 122 of the tire 116 to contact the metal portion 114 of the shorter side portion producing a sound thereby alerting the driver to the loose wheel hazard. In preferred embodiment the metal portion 114 is metal and since the rim 122 is also metal, the metal to metal contact will create squealing noise thereby alerting the driver of the vehicle to the risk.

The metal portion 114, in a preferred embodiment, is mounted on the shorter side portion by a small spacer element 112. The preferred distance between the metal piece and the rim of the wheel is preferably one-quarter inch.

In a preferred embodiment of the present invention, the long, short and cross portions 106, 108 and 104, of the loose wheel indicator 102 are no less than one-half inch from the front tire of the vehicle so as to create an approximately one-half inch clearance between the tire and the substantially J-shaped loose wheel indicator bracket 102. The loose wheel indicator of the present invention is preferably adapted to be installed on a turning wheel assembly but could be installed on another wheel assembly.

In practice, it is usually preferable to have a wheel retainer mechanism such as is taught in the present invention on the non-turning wheel assemblies since the wheel is contained in the event that it flies off of the vehicle. The loose wheel indicator is preferably used in addition to the wheel retainers on the rear wheels of the tractor and/or trailer.

A suitable clearance distance between the loose wheel indicator bracket and the tire, at its narrowest point, should be such that the tire will not normally rub against the bracket at any time during normal use. Only if the wheel comes loose would the rim of the tire, or other part of the wheel assembly, come into contact with the indicator assembly. This would be understood and recognized by a person skilled in the art. One-half inch appears to be the narrowest practical clearance distance.

Modifications and alterations to the wheel retainer 10 of the present invention are contemplated and are within the scope of the invention. Given the great variation in vehicles, there are corresponding further embodiments of wheel retainers.

The embodiments of the invention in which an exclusive property or privilege is claimed are defined as follows:

1. A wheel retainer for retaining a wheel assembly on a vehicle, the wheel retainer comprising:

a pair of mounting brackets, said mounting brackets having a first portion with a first end and a second portion with a second end, the mounting brackets adapted to be mountable on an underframe of a vehicle, to bracket an axle of the vehicle on which at least one wheel is held, such that the first end of the first portion of the mounting bracket attaches to the underframe, and extends below the underframe to the second portion, the second portion of the mounting bracket extending outwardly parallel to the axle, to the second end in front of the outermost of the at least one wheel; and at least one retaining bar, said at least one retaining bar extending substantially perpendicular to said axle from the second end of one mounting bracket to the second end of the other mounting bracket, and wherein the second portion of the mounting bracket is a hollow tube and the second end is open, and the retaining bar additionally comprises substantially perpendicular tube portions at its ends, which perpendicular tube portions slide into the second ends of the mounting brackets.

2. The wheel retainer according to claim 1 wherein the at least one retaining bar is positioned in the upper half of the at least one wheel or wheel assembly.

3. The wheel retainer according to claim 1 wherein the at least one retaining bar is positioned between the top of a rim of the at least one wheel and the middle of the rim of the at least one wheel.

4. The wheel retainer according to claim 3 wherein the wheel retainer further comprises a fastening means for movably or removably fastening the at least one retaining bar to the mounting brackets.

5. The wheel retainer according to claim 4 wherein said fastening means comprises a removable retaining bolt or pin running perpendicularly through the hollow tube of the mounting bracket and the perpendicular tube portion of the retaining bar and secured with a retaining clip.

6. The wheel retainer according to claim 1 wherein the at least one retaining bar is joined to the mounting bracket by a hinge and adapted to swing outwards or upwards to allow the at least one wheel to be accessed.

7. The wheel retainer according to claim 1 wherein said wheel retainer further comprises a single retaining bar and wherein said single retaining bar spans a plurality of wheels or wheel assemblies on said vehicle, and wherein said single retaining bar comprises a plurality of perpendicular portions for insertion into a plurality of mounting brackets, said mounting brackets adapted for mounting on the underframe of the vehicle.

8. The wheel assembly according to claim 1 wherein components of the wheel retainer are made of a material selected from the group consisting of cold rolled steel, stainless steel, and aluminum.

9. The wheel assembly according to claim 8 wherein the components are either steel or stainless steel.

10. A wheel retainer for retaining a wheel assembly on a vehicle, the wheel retainer comprising:

a pair of mounting brackets to bracket an axle of the vehicle, each mounting bracket in the pair having a first portion with a first end and a second portion with a second end, each mounting bracket in the pair adapted to be mountable on an underframe of a vehicle;

such that the first end of the first portion of each mounting bracket attaches to the underframe and extends outwardly and downwardly below the underframe to the second portion of the mounting bracket which extends, parallel to the axle, outwardly beyond the wheel assembly; and at least one retaining bar, the at least one retaining bar adapted to extend perpendicular to the axle of the vehicle, being secured onto each of the second ends of each of the mounting brackets in the pair to contain at least one wheel of the wheel assembly.

11. The wheel retainer according to claim 10 wherein the at least one retaining bar is positioned in the upper half of the at least one wheel or wheel assembly.

12. The wheel retainer according to claim 10 wherein the at least one retaining bar is positioned between the top of a rim of the at least one wheel and the middle of the rim of the at least one wheel.

13. The wheel retainer according to 12 wherein the second portion of each of the mounting brackets of the pair is a hollow tube and the second end of each of the mounting brackets of the pair is open, and the at least one retaining bar additionally comprises perpendicular tube portions at its ends, which perpendicular tube portions slide into the second ends of the mounting brackets.

14. The wheel retainer according to claim 13 wherein the wheel retainer further comprises a fastening means for movably or removably fastening the at least one retaining bar to the mounting brackets.

15. The wheel retainer according to claim 14 wherein said fastening means comprises a removable retaining bolt or pin running perpendicularly through the hollow tube of the mounting bracket and the perpendicular tube portion of the retaining bar and secured with a retaining clip.

16. The wheel retainer according to claim 10 wherein the at least one retaining bar is secured to the mounting brackets by a hinge swinging outwards or upwards to allow one or more wheels to be accessed.

17. The wheel retainer according to claim 10 wherein said wheel retainer further comprises a single retaining bar and wherein said single retaining bar spans a plurality of wheels or wheel assemblies on said vehicle, and wherein said single retaining bar comprises a plurality of perpendicular portions for insertion into a plurality of mounting brackets said mounting brackets adapted for mounting on the underframe of the vehicle.

* * * * *